Dec. 22, 1931.     F. F. HOPF     1,838,021
LUGGAGE RACK
Filed Sept. 17, 1928
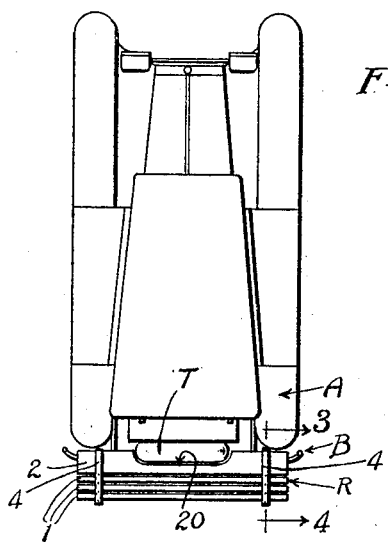
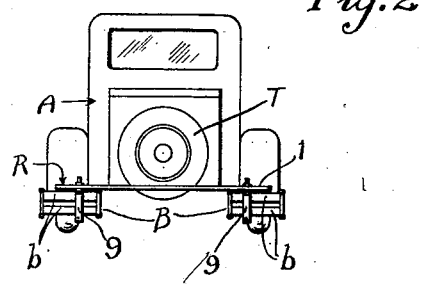
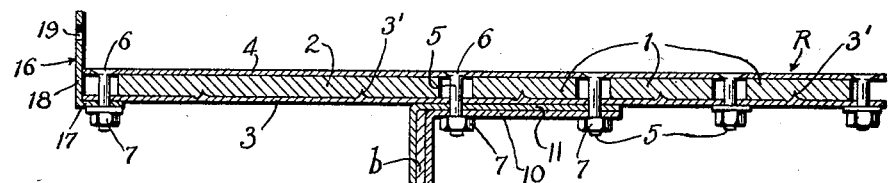
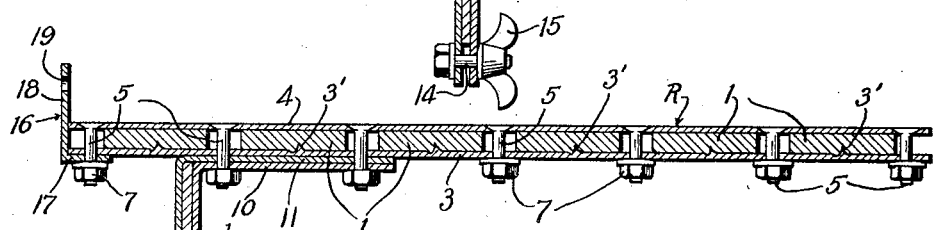
INVENTOR.
Floyd F. Hopf Patented Dec. 22, 1931

1,838,021

UNITED STATES PATENT OFFICE

FLOYD F. HOPF, OF LOS ANGELES, CALIFORNIA, ASSIGNOR TO FRED R. BARBOUR, OF LOS ANGELES, CALIFORNIA

LUGGAGE RACK

Application filed September 17, 1928. Serial No. 306,479.

This invention relates to and has for a main object the provision of an improved type of detachable luggage rack adapted to be supported on the front or rear bumpers of motor vehicles.

An object is to provide a simple and economical luggage rack of light weight, re-inforced, and provided with means whereby the same may be quickly attached to and detached from various types of bumpers forming part of the accessory equipment of automobiles, and is adapted to be used either at the front or rear end thereof.

Other objects may appear as the description progresses.

In the accompanying drawings I have shown a preferred form of device, capable, however, of modification within the scope of the appended claims without departing from the spirit of my invention.

In said drawings,

Figs. 1 and 2 are, respectively, a plan view and a rear end elevation of an automobile showing my improved luggage rack attached thereto.

Figs. 3 and 4 are transverse enlarged sections of the luggage rack on line 3—4 of Fig. 1, showing the attaching means adjusted to different positions on the rack.

The device as shown, may include a plurality of horizontal slats 1, 1, etc., as shown in Fig. 4, or a plurality of the slats 1, 1, etc., with a substantially wide slat 2 used in connection therewith, as shown in Fig. 3. The slats 1 and 2 are supported in parallel positions and in a common horizontal plane between pairs of metal cleats 3 and 4, which are connected by means of bolts 5, 5, etc., as shown. The slats are substantially spaced apart and the bolts 5 extend through the spaces between the slats. The heads 6 of the bolts are counter-sunk in the upper cleats 4, while the bolts extend through the lower cleats 3 and are provided with washers and nuts 7, 7 for clamping the cleats and slats together and holding them in assembled relation.

The lower cleats 3, 3 are preferably provided with burrs or struck out portions 3', 3', etc., which are adapted to pierce the slats 1 and 2 for holding the slats uniformly spaced apart and against lateral and longitudinal movement on the cleats.

A pair of attaching members 8 and 9 are provided for adjustable connection with the rack and include elongated feet 10 and 11 and depending portions 12 and 13 respectively. As shown in Figs. 3 and 4, the feet 10 and 11 of said members are adapted to engage the lower side of the cleat 3 and to be held on the rack by a pair of the bolts 5 and the nuts 7 which may extend through the feet 10 and 11.

The members 8 and 9 may be adjusted transversely of the rack so as to register with any two selected bolts 5. The portions 12 and 13 of the attaching members are spaced apart to correspond to the thickness of the bars $b, b$ of the bumpers B, so that the rack R may be held on the bumpers B of an automobile A in a horizontal plane, as shown in Figs. 1 and 2.

The lower ends of the attaching members are provided with bolts 14 and wing nuts 15, by means of which the attaching members may be firmly clamped on the bumpers B.

The outer side of the rack R is provided with a pair of members 16, 16 which are attached to the ends of the cleats 3 and 4 respectively, and have horizontally bent portions 17 underlying the cleats 3 and held in position by means of one of the bolts 5 and nuts 7. Said members also have vertical portions 18 which abut the ends of the cleats 3 and 4 and are provided with orifices 19 through which ropes or cords may be extended for tying packages on the rack.

The wide slat 2 of the bumper is useful particularly when a spare tire, as at T, is carried on the rear of the automobile A, and said slat may be cut away, as at 20, for providing clearance for the tire.

It will be noted that inasmuch as my improved rack is applicable to the bumper of an automobile, the rack may be attached to and detached from operative position more readily than in other types of devices, which require attachment to the automobile frame and necessitate drilling holes for bolts and the like through said frame.

By adjusting the attaching members 8 and 9 transversely on the rack R, it will be observed that the rack may be extended rearwardly from the back of the automobile sufficiently to meet all ordinary requirements.

Having thus described my invention, what I claim is:

1. A luggage rack comprising a bed formed of a plurality of parallel slats spaced apart, pairs of cleats arranged above and below said slats and longitudinally spaced apart, bolts connecting the cleats of each pair and extended through the spaces between the slats, and means adjustable transversely of the slats and adapted to be held at selected positions on said bolts for detachably supporting said rack in operative position.

2. A luggage rack comprising a bed formed of a plurality of parallel slats spaced apart, pairs of cleats arranged above and below said slats and longitudinally spaced apart, bolts connecting the cleats of each pair and extended through the spaces between the slats, and means adjustable transversely of the slats and adapted to be held at selected positions on said bolts for detachably supporting said rack in operative position, said attaching means including a pair of right angularly bent members having horizontal portions underlying said cleats and engaging said bolts, and substantially vertical portions spaced apart and adapted to receive a supporting member therebetween.

3. A luggage rack comprising a bed formed of longitudinal slats spaced apart, pairs of transverse cleats arranged on the tops and bottoms of said slats, bolts connecting said cleats and extended thru the spaces between said slats, one of the slats of each pair being provided with lugs for piercing the slats to prevent the misalinement thereof, attaching means supported on said pairs of slats for supporting the bed in position for use, said attaching means comprising pairs of angle members having depending portions engageable with opposite sides of and attachable to a supporting member, and rearwardly extended portions superposed one on the other and secured to said cleats by certain of said bolts.

FLOYD F. HOPF.